May 11, 1926.                O. ANDERSON                1,584,069
                              JOINT CLAMP
                           Filed June 23, 1925
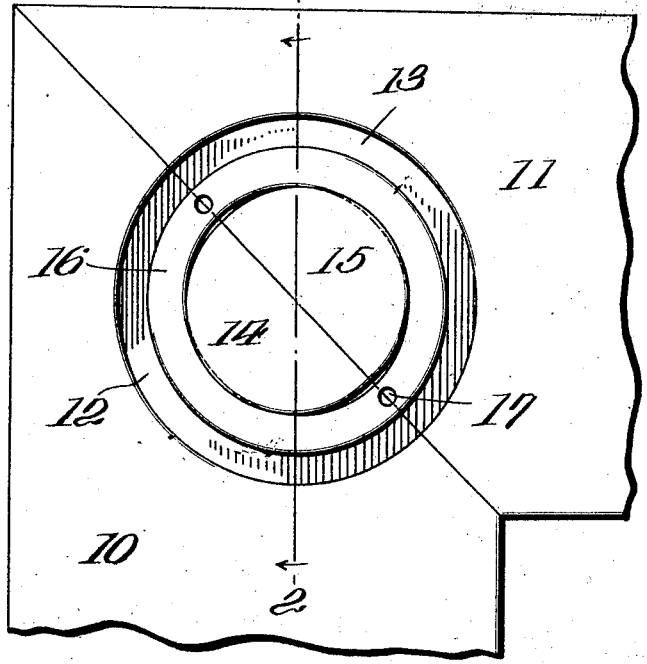
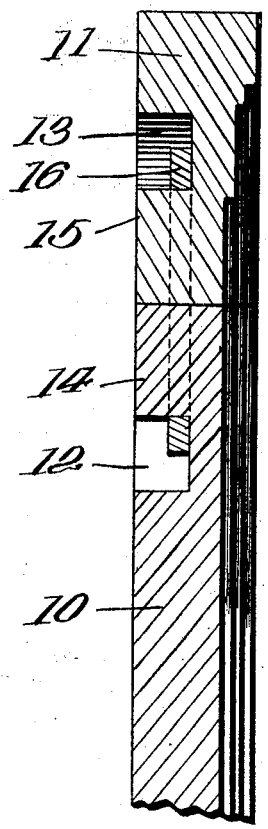
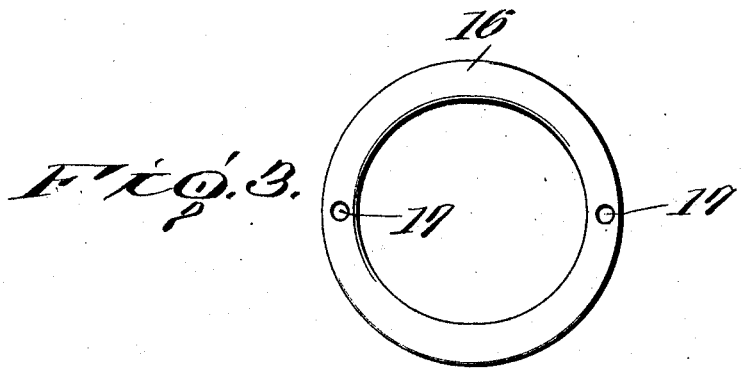
Inventor
Alof Anderson
By Walter F. Rogers
his Attorney Patented May 11, 1926.

1,584,069

UNITED STATES PATENT OFFICE.

OLOF ANDERSON, OF LOUISVILLE, KENTUCKY.

JOINT CLAMP.

Application filed June 23, 1925. Serial No. 39,062.

This invention relates to an improvement in eccentric joint clamps and the object of this invention is to join two pieces of wood or other material together at their abutting edges.

The invention consists in forming at the adjoining ends of each member an annular groove wherein each member will be provided with a semi-disk. The periphery of each semi-disk is made eccentric and when the two disks are brought together by joining the two members, the diameter in one direction is smaller than when taken in another direction or at 90 degrees, the diameter being smaller along the meeting edges of the two semi-disks. These semi-disks are encircled by a ring the bore of which is also eccentric, and after it has been placed about the semi-disks it is given a rotation until the two semi-disks are drawn snugly together along their plain surfaces, so that the two members are securely and firmly locked together.

The invention consists of certain other novel features of construction and combination of parts which will be hereinafter described.

In the accompanying drawings:

Figure 1 is a top plan view showing the invention applied to the two members joined on the miter joint.

Figure 2 is a vertical sectional view, and

Figure 3 is a top plan view of the ring and clamp.

Members 10 and 11 which may be of wood or other material have their ends cut at an angle so that when brought together a miter joint is formed. Of course it is to be understood that with this invention it is not necessarily limited to a miter joint but may be any joint where two members are arranged at an angle one to the other.

Each member 10 and 11 is provided with a mortise 12 and 13, which when in alinement produces an annular groove. The formation of this mortise or groove in the abutting ends of the two members 10 and 11 produces a semi-disk 14 on the member 10, and a semi-disk 15 on the member 11. The peripheral surfaces of the semi-disks 14 and 15 are eccentric, the smallest diameter when the two disks are together being along their adjoining edges, and the greatest diameter being at right angles to this line or at 90 degrees.

Fitted in the mortise 12 and 13 of the members 10 and 11 and surrounding the semi-disks 14 and 15 is a clamp or ring 16, the inner bore of which is eccentric. The bore of this clamp is formed to conform to the configuration of the peripheral surfaces of the semi-disks 14 and 15, so that the ring when rotated after being placed about the semi-disks 14 and 15 will bring its smallest diameter into engagement with the greatest diameter through the semi-disks 14 and 15 and force the abutting edges of the semi-disks 14 and 15, and the members 10 and 11 together for securely fastening the two members together.

The clamp or ring 16 is provided with two openings 17, 17, in which a spanner wrench may be inserted for giving a quarter turn to the ring for clamping the members 10 and 11 together.

Having described my invention, what I claim as new and desire to secure by Letters Patent is:

1. A joint clamp comprising two members arranged adjacent to each other, and having semi-disks at their abutting edges, and an eccentric clamp engaging the semi-disks for drawing and locking the two clamps together when the clamp is given a partial rotation.

2. A joint clamp comprising two members arranged adjacent to each other and having semi-circular slots formed in the adjacent sides thereof producing an annular eccentric slot, and an annular eccentric clamp fitted in the annular eccentric slot of the two members for joining the two members together when the clamp is given a partial rotation.

3. A joint clamp comprising two members arranged adjacent to each other and having eccentric shaped members thereon, an eccentric ring engaging said eccentric members for drawing and locking the two members together when the ring is given a partial rotation.

OLOF ANDERSON.